US008733985B2

(12) United States Patent
Storm

(10) Patent No.: US 8,733,985 B2
(45) Date of Patent: May 27, 2014

(54) HORIZONTALLY AND VERTICALLY MOUNTABLE FIXTURE EXTENSION THAT CAN BE LOWERED FOR SERVICE

(75) Inventor: Greg Lyle Storm, Laurium, MI (US)

(73) Assignee: GLS Innovations, L.L.C., Laurium, MI (US)

( * ) Notice: Subject to any disclaimer, the term of this patent is extended or adjusted under 35 U.S.C. 154(b) by 176 days.

(21) Appl. No.: 13/572,382

(22) Filed: Aug. 10, 2012

(65) Prior Publication Data

US 2014/0043835 A1 Feb. 13, 2014

(51) Int. Cl.
*B60Q 1/076* (2006.01)

(52) U.S. Cl.
USPC ........... 362/386; 248/328; 362/388; 362/403; 362/404; 362/428

(58) Field of Classification Search
USPC .......... 248/324, 327, 328; 362/386–388, 403, 362/404, 407, 428
See application file for complete search history.

(56) References Cited

U.S. PATENT DOCUMENTS

| | | | | |
|---|---|---|---|---|
| 3,035,804 A * | 5/1962 | Wilson | 248/328 |
| 5,105,349 A | 4/1992 | Falls et al. | |
| 5,420,772 A * | 5/1995 | Evans | 362/386 |
| 6,261,122 B1 | 7/2001 | Richter | |
| 6,464,190 B1 | 10/2002 | Aramaki | |
| 7,033,048 B2 | 4/2006 | Sin | |
| 7,494,254 B2 | 2/2009 | Rogers | |

OTHER PUBLICATIONS

"Garage door opener—Wikipedia, the free encyclopedia", [Online]. Retrieved from the Internet: <URL: http://en.wikipedia.org/wiki/Garage_door_opener>, (Accessed Mar. 25, 2013), 3 pgs.

"Line-Voltage Socket Design Competition—Lighting Transformations, Programs", [Online]. Retrieved from the Internet: <URL: www.lrc.rpi.edu/programs/lightingtransformation/linevoltage/index.asp>, (Accessed Mar. 25, 2013), 2 pgs.

"Philips Sportlite—Remote Lighting Lifter", [Online]. Retrieved from the Internet: <URL: www.sportlite.com/UI/Remote-Lighting-Lifter-Now-In-Stock.aspx?ptype=2&mcid=13&pcid=13&ccid=13>, (Accessed Mar. 25, 2013), 1 pg.

Admin, "What is the Difference Between AC and DC?", [Online]. Retrieved from the Internet: <URL: www.wereyouwondering.com/what-is-the-difference-between-ac-and-dc/>, (Jun. 26, 2008), 5 pgs.

(Continued)

*Primary Examiner* — Stephen F Husar
(74) *Attorney, Agent, or Firm* — Schwegman, Lundberg & Woessner, P.A.; Matthew Prater; Thomas Obermark

(57) ABSTRACT

An example includes a lamp system couplable to a vertical structure and a horizontal structure, the system including a base including a first electrical contact couplable to a power source, a motor coupled to the base, the motor couplable to the power source, a cord coupled to the motor, with the motor configured to extend and retract the cord with respect to the base and a lamp socket coupled to the cord, the lamp socket including a second electrical contact mateable to the first electrical contact to electrically couple the lamp socket to the power source, wherein the base is hingedly couplable to a hinge plate, with a proximal portion of the hinge plate to be hinged to a side of the base in a vertical-mount configuration, with the cord extending through a channel located on a distal end of the hinge plate.

20 Claims, 10 Drawing Sheets

(56) References Cited

OTHER PUBLICATIONS

Brain, Marshall, “HowStuffWorks—How Remote Entry Works”, [Online]. Retrieved from the Internet: <URL: http://auto.howstuffworks.com/remote-entry.htm>, (Accessed Mar. 25, 2013), 3 pgs.

Nave, R, “Induction Motor Action”, [Online]. Retrieved from the Internet: <URL: http://hyperphysics.phy-astr.gsu.edu/hbase/magnetic/indmot.html>, (Accessed Mar. 25, 2013), 4 pgs.

Nice, Karim, “HowStuffWorks—How Gears Work”, [Online]. Retrieved from the Internet: <URL: science.howstuffworks.com/transport/engines-equipment/gear.htm>, (Accessed Mar. 25, 2013), 3 pgs.

Taub, Eric, “How Long Did You Say That Bulb Would Last?—NY Times.com”, [Online]. Retrieved from the Internet: <URL: http://bits.blogs.nytimes.com/2009/02/11/how-long-did-you-say-that-bulb-will-last/>, (Feb. 11, 2009), 12 pgs.

* cited by examiner

HORIZONTALLY AND VERTICALLY MOUNTABLE FIXTURE EXTENSION THAT CAN BE LOWERED FOR SERVICE

TECHNICAL FIELD

This document pertains generally to light fixtures, and more specifically to horizontally and vertically mountable fixture extension that can be lowered for service.

BACKGROUND

In some structure, it is beneficial to have lighting placed very high in the structure, out of reach of a normal person. Such a design, while providing the benefit of a wide broadcast of light, presents a number of problems. For example, if the lamp has a shorter service life, as is common among filament lamps, replacing the lamp can be a hassle, requiring a ladder or even a boom lift, man lift or basket crane. Some of these devices can be quite expensive to own or rent. Accordingly, what is needed is a method to enable people to service high-mounted lamps more easily.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Embodiments of the present subject matter provide increased access to lamp sockets, such as by providing for their lowering from elevated heights so that they can be services without the aid of a ladder or some other device to elevate a service person. Of particular interest is the ability of examples disclosed herein to enable disabled persons to easily change lamps without the aid of special devices or assistance personnel.

Among the unique aspects of the present subject matter is an ability of a single lamp system to be used both for horizontal mounting, such as on a ceiling, and vertical mounting, such as on a wall, and on surfaces that are sloped. References herein to horizontal or vertical surfaces are not limited to surfaces perfectly in line with, or orthogonal to, a gravity vector, and include surfaces that are substantially inline with or orthogonal to a gravity vector, such as those conforming to building code definitions of what is horizontal and what is vertical. Examples can be adapted for use on sloped surfaces as well, such as those inside an attic conforming to a roof with a raked exterior.

Embodiments provide for locking of a hinge member to a base so that the hinge member is prevented from hinging, allowing the system to be mounted horizontally. With the hinge member unlocked, the system can be mounted vertically. Accordingly, the same system can be used in either configuration, and ability that reduces complexity and thus lowers cost, simplifies retail distribution and gives users added flexibility in how they increase lamp service accessibility in their dwelling.

Systems and methods discussed herein are mountable to existing structural openings in that they can be fastened to existing openings, such as a junction box or light box. Accordingly, these system and methods can be used with new work and existing work. In existing work examples, systems and methods can be retrofit to existing openings in a structure such as a rough opening. Examples can cover the rough opening in use, as discussed herein.

Figures 1A, 1B, 1C, 1D:
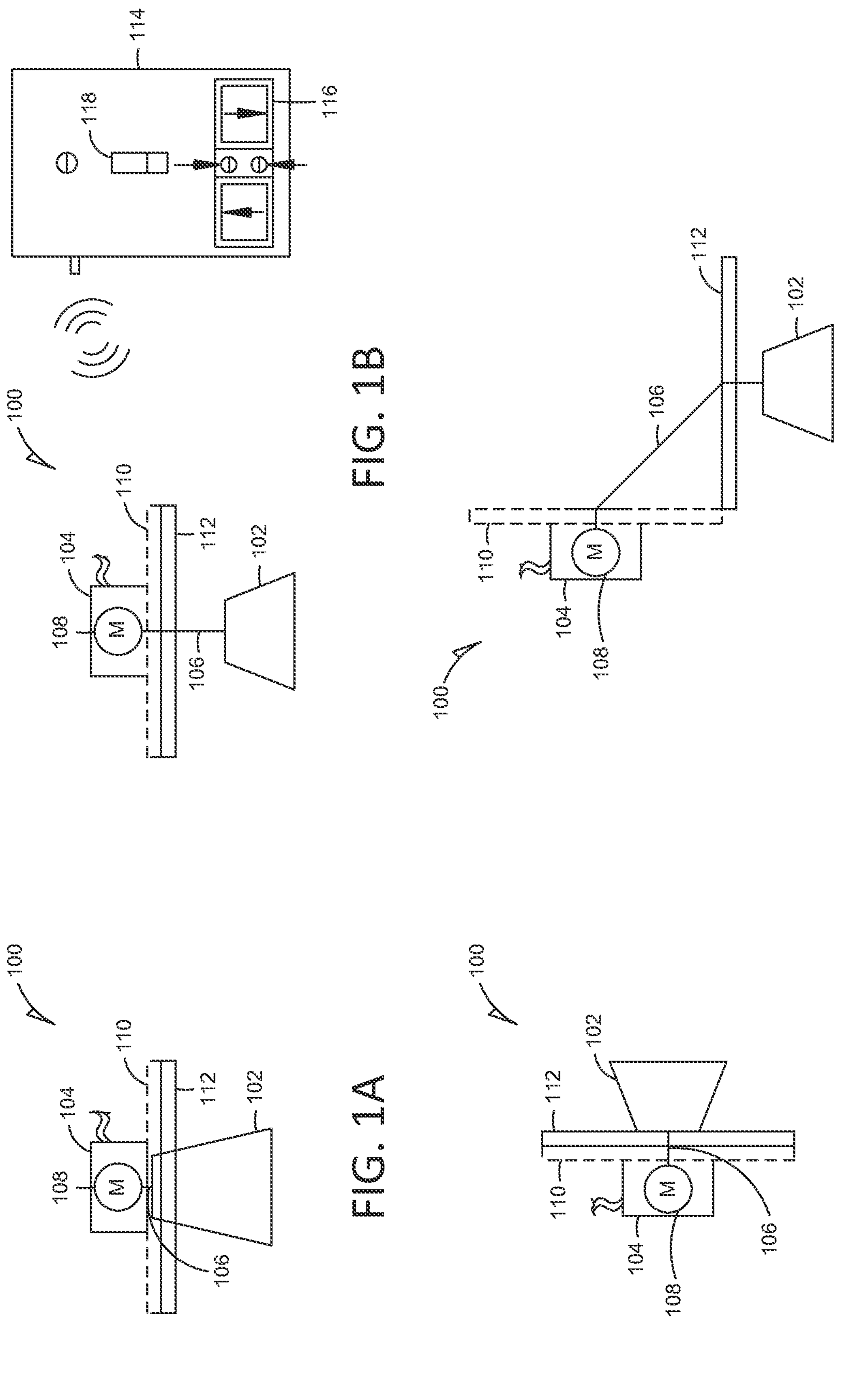
FIG. 1A is a diagram of a lamp socket deployment system in a horizontal mount mode, according to an example.
FIG. 1B is a diagram of the lamp socket deployment system of FIG. 1A, in which the lamp socket is deployed via remote input control, according to an example.
FIG. 1C is a diagram of a lamp socket deployment system of FIG. 1A in a vertical mount mode, according to an example.
FIG. 1D is a diagram of the lamp socket deployment system of FIG. 1A, in which the lamp socket is deployed from the vertically mounted lamp socket deployment system via remote control according to an example.

FIGS. 1A-E shows diagram of a deployment system in various phases of adjustment. FIG. 1A shows a horizontal mount mode, according to an example. FIG. 1B is a diagram of the lamp socket deployment system of FIG. 1A, in which the lamp socket is deployed via remote control, according to an example. FIG. 1C is a diagram of a lamp socket deployment system of FIG. 1A in a vertical mount mode, according to an example. FIG. 1D is a diagram of the lamp socket deployment system of FIG. 1A, in which the lamp socket is deployed from the vertically mounted lamp socket deployment system via remote control, according to an example.

Returning to FIG. 1A, a deployable load such as a lamp socket 102 is suspended from a base 104 by a cord 106.

Examples discussed herein can refer to lamp socket, but are not so limited, and can refer other loads, such as loads suspended from a hook or eyelet, fans, speakers, and other loads that can be fastened to a structure, such as to a power junction box of a structure.

As used herein, a lamp socket can include a receptacle to couple to a bulb. In some examples, the lamp socket is a female ceramic receptacle housing electrical terminals such as a pair of electrical terminals. In some examples, a light diffracting element such as a lens or another housing can be included as part of the lamp socket. A light diffracting element can envelop some or all of a lamp such as a bulb installed in the lamp socket. As used herein, a cord can comprise a fabric core, cable, or chain or another flexible element compatible with winding or otherwise retracting into the base 104.

In some examples, a motor 108 is adapted to retract cord toward or into the base 104. The motor in some examples is coupled to a pulley to turn the pulley to wind the cord around the pulley. In other examples, one or more pulleys are adapted to retract a cord into the base, such as into a bag a box or another storage device.

The base 104 can optionally include a flange 110. The flange can be used to mount the base, such as into a rough opening in a wall or another structure. The flange can be disposed inside such a rough opening, or outside. The flange can be flush with a structure, in some examples.

In various examples, a hinge member 112 is optionally coupled to a base 104, such as via a flange 110 or some other portion of the base. The hinge member can be plate shape and in some examples can have an exterior shape resembling crown molding. The hinge member 112 can move hingedly with respect to the base 104. For example in FIG. 1D, the hinge member 112 is shown hinged away from the base 104 and the flange 110. However, in some horizontal mount examples, the hinge member can be removed from the system without affecting the system's ability to provide for deployment of the lamp socket 102. For example, a hinge pin holding the hinge member 112 to the base 104 could be removed.

Motion of the hinge plate 112 away from the base 104 can be controlled by the motor 108. For example, the motor 108 can be controlled to deploy the lamp socket 102 by releasing the cord 106, such as increasingly lengthening the cord. As the cord is lengthened, the lamp socket 102 can move away from the base. In FIG. 1B the lamp socket only is moved away from the base 104. In FIG. 1D, the lamp socket 102 is moved away from the base in addition to the hinge member 112 being hinged away from the base 104. In some examples the locate of a fairlead such as a channel or aperture in the hinge member 112, to receive and guide the cord 106, is selected with respect to the positioning of the base 104 so that the hinge member 112 is encouraged to hinge away from the base when the cord 106 is deployed. As described herein, a cord coupled to the base can encourage motion of the fairlead along the hinge to further encourage hinge motion, although the present subject matter is not so limited and can include other system and methods of moving the hinge member away from the base 104, such as through mechanical or electromechanical actuation.

As illustrated in FIG. 1B, a controller 114 can include one or more inputs 116 such as one or more moment switches that can be actuated to control the motor. Optionally, a switch serving another purpose, such as a light switch 118, can also be used, such as by signaling with the light switch such as with rapid cycling or with actuation according to a sequence. In an example, a motor controller to control the motor 108 can be positioned proximal the motor in electrical communication with the motor, and can receive a signal from the controller 114, such as wirelessly, e.g., through infrared communication, or through wiring. In some examples, wiring used to control power to the lamp socket 102 via the light switch 118 can also be used to carry a signal from the controller 114 to the motor 108 to communicate a signal to deploy or retract the lamp socket 102.

Figure 2A:
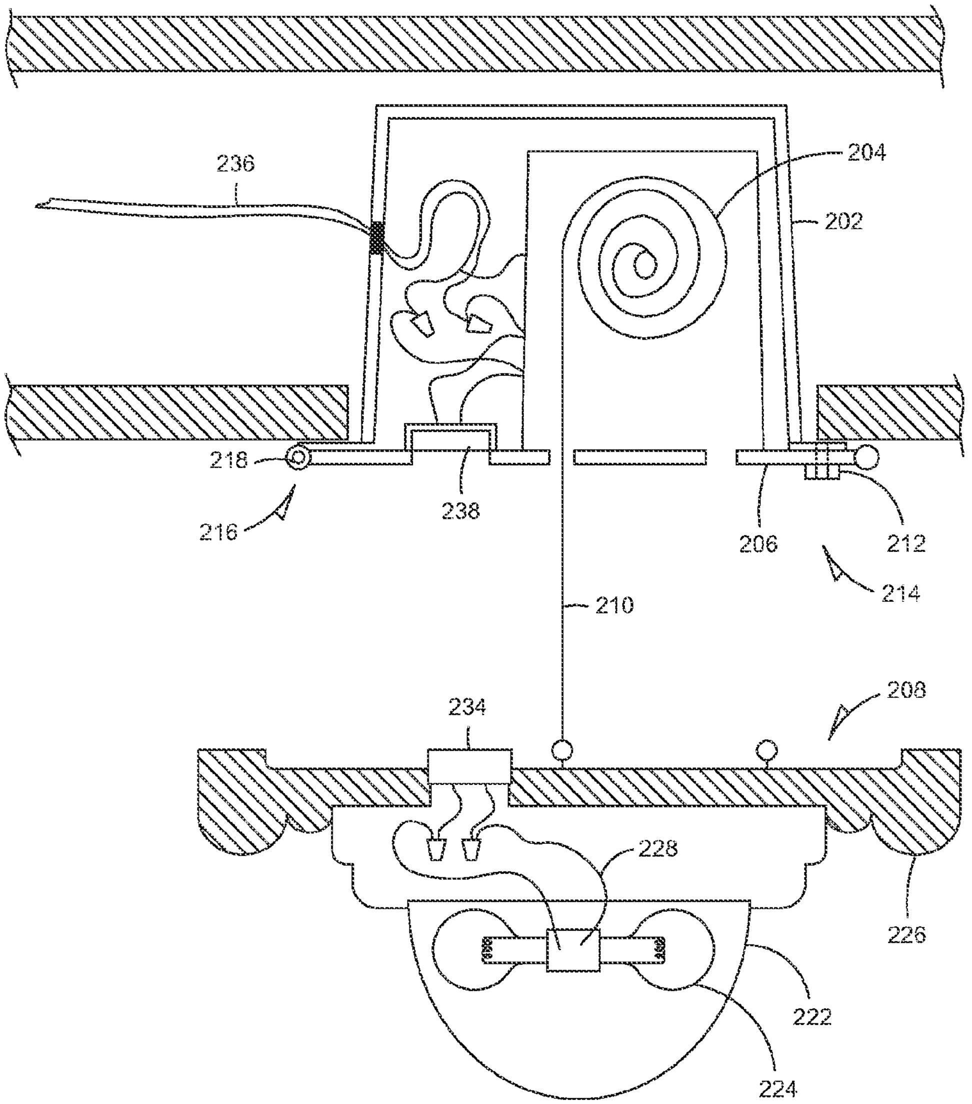
FIG. 2A is a horizontally mounted lamp socket system with a horizontal lamp and fixture deployed, according to an example.

FIG. 2A is a horizontally mounted lamp socket assembly system with a horizontal lamp and fixture deployed, according to an example. The example includes a base 202, a motor 204 and a hinge member 206. As shown by the illustration, the lamp socket assembly 208 can be lowered, such as by deploying the cord 210, while the hinge member 206 remains disposed substantially against the base 202. In various examples, the hinge member 206 can remain disposed against the base 202 via fastening the two together, such as with a fastener 212. The fastener can be disposed distally 214 along the hinge member 206, away from a proximal portion 216 that includes a hinge joint 218, although the present subject matter is not so limited. For example, the position of the hinge member with respect to the base 202 can be controlled with mechanical or electromechanical actuation, including, but not limited to using a motor to control the position.

The lamp socket assembly 208 can include a horizontal diffractor 272, such as a glass housing. In examples in which a horizontal diffractor 222 is used, a lamp 224 can shine through the horizontal diffractor 222. An optional trim piece 226 can be coupled such as to the diffractor and form the lamp socket assembly 208. The lamp socket assembly 208 can include a ceramic female lamp connector 232 sized to mate to the lamp 224. Other materials can be used for the female lamp connector 232, and the male/female orientation is reversed in some examples. Electrical leads 228 can extend from the lamp connector 232 to an assembly contact 234. The socket assembly contact 234 can include one or more electrical contacts configured to repeatedly place the lamp socket assembly 208 in electrical communication with a power supply through contact with a base contact 238.

Figure 2B:
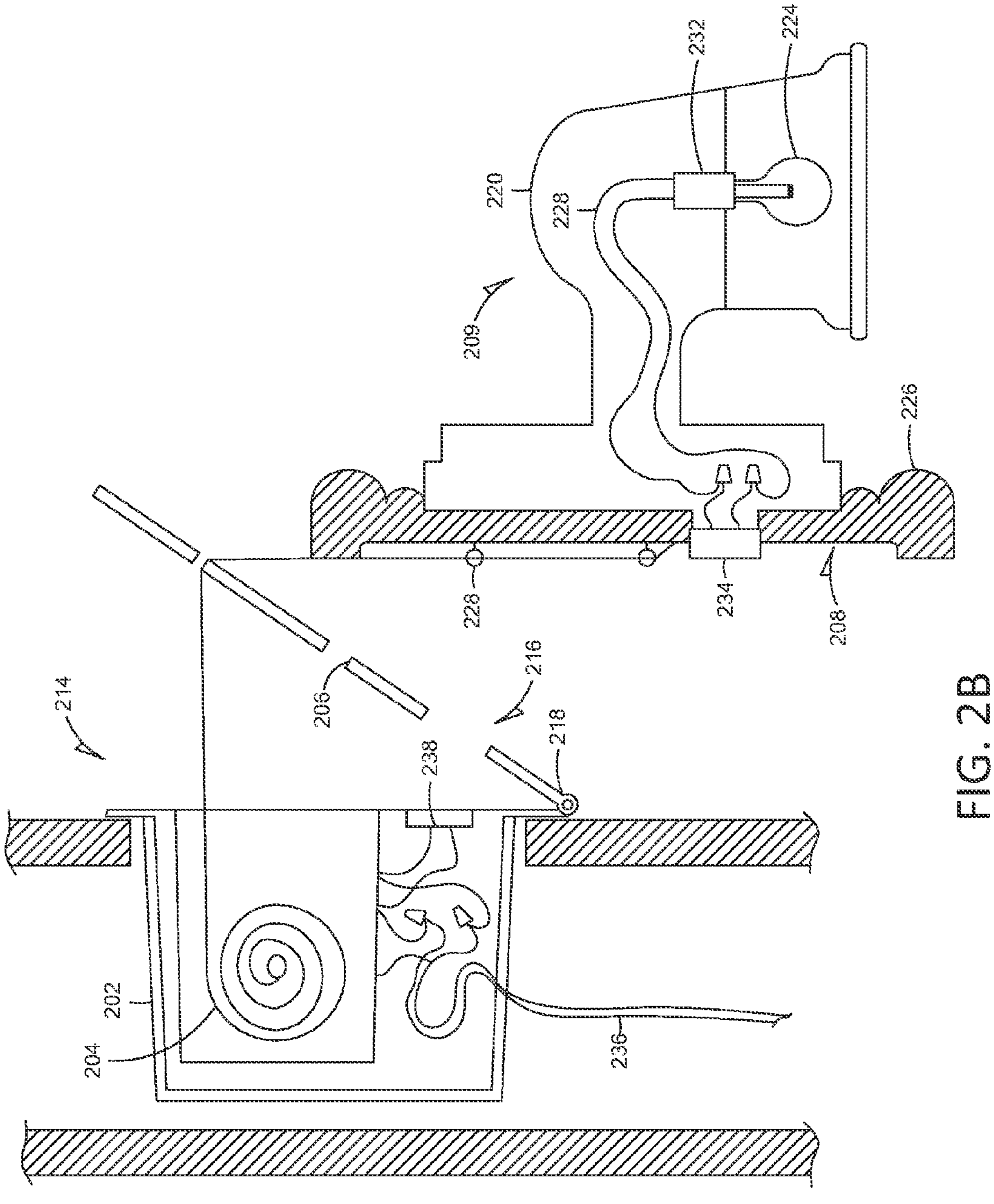
FIG. 2B is a vertically mounted lamp socket system with a vertical lamp and fixture deployed, according to an example.

FIG. 2B is a vertically mounted lamp socket system with a vertical lamp and fixture deployed, according to an example. In the vertical mode, a vertical diffractor 220 can be used so that the lamp assembly resembles a typical vertical lamp. In the example, the fastener 212 is not in use, and the hinge member 206 is free to hinge with respect to the base 202. As such, upon deployment of the cord by the motor 204 the hinge member 206 is free to hingedly rotate away from the base 202. The weight of the load 209 can urge the hinge member 206 to rotate away from the base 202.

Figure 3A:
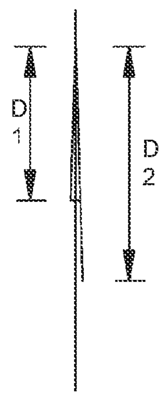
FIG. 3A is a diagram showing linkage representing a lamp socket system in which the fairlead is movable, in which the system is not deployed, according to an example.
Figure 3B:
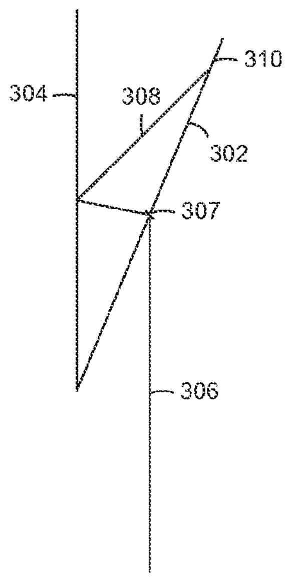
FIG. 3B is a diagram of the linkage of FIG. 3B, in which the hinge plate is rotated about 30 degrees with respect to the base.
Figure 3C:
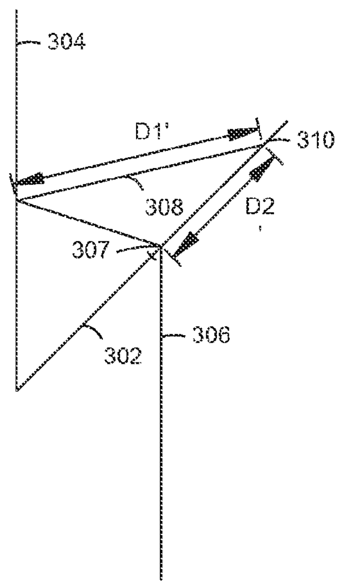
FIG. 3C is a diagram of the linkage of FIG. 3B, in which the hinge plate is rotated about 45 degrees with respect to the base.
Figure 3D:
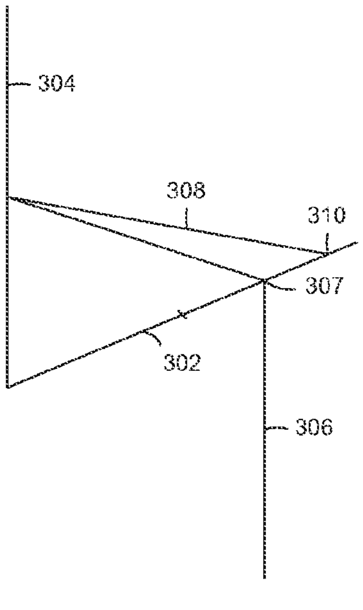
FIG. 3D is a diagram of the linkage of FIG. 3B, in which the hinge plate is rotated about 60 degrees with respect to the base.
Figure 3E:
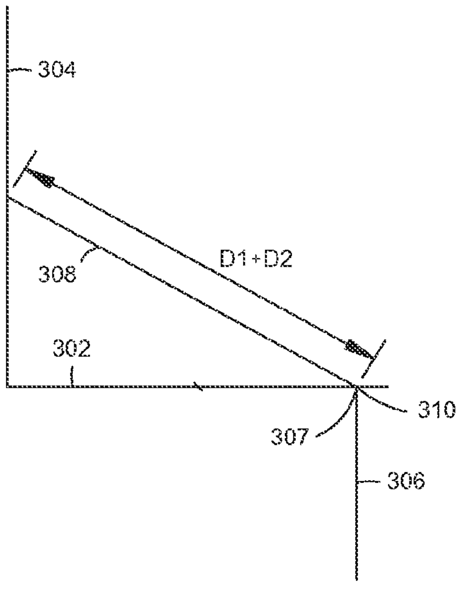
FIG. 3E is a diagram of the linkage of FIG. 3B, in which the hinge plate is rotated about 90 degrees with respect to the base.

FIGS. 3A-E show linkage representing a lamp socket system in which the fairlead is movable. A base 304 and a hinge member 302 are hingedly coupled. A first cord 306 extends through a first fairlead 307 and can suspend a lamp socket. A second cord 308 extends through a second fairlead 310, which can be in a fixed location along the hinge member, to the first fairlead 307 and can fix the location of the first fairlead 307 with respect to the hinge member 302. To illustrate the relationship between the second cord 308 and the location of the first fairlead 307, consider that D1+D1=D1'+D2'. The second cord 308 can be fixed on one end to the base 304 and on the other to the first fairlead 307 so that movement of the hinge member 302 away from the base 304 will move the first fairlead 307 closer to the second fairlead 310, ultimately resulting in their approximate colocation as illustrated in FIG. 3E.

The approach illustrated in FIGS. 3A-E is helpful to allow large lamp sockets to be lowered from a base without the lamp sockets hitting the vertical structure. By moving the second fairlead 307 away from the vertical structure, a wider berth is available through which large lamp sockets can pass.

FIGS. 4A-D provide views of a lamp socket deployment system, according to an example. In the example, a base 402 is hingedly couplable to a hinge member 404. In the example, the base is sized for mounting in or on a structure, and an exterior dimension of the hinge member 404, such as the diameter, is large enough to cover the seam between the base 402 and the structure. A motor 406 can be coupled to the base 402, such as through bracketry. An axle assembly 408 can also be coupled to the base 402. A worm drive assembly 410 can impart rotation onto the axle assembly to turn one or more pulleys 412.

A first cord 414 can be fed through a first fairlead 416, such as by routing over a rod with a smooth surface. The first cord 414 can then be coupled to a second fairlead 418. Accordingly, as the hinge member 404 moves away from the base 402, the second fairlead 418 moves toward the first fairlead 416.

One or more rotating pulleys 4112 of the axle assembly can retract or deploy a second cord 422. The second cord 422 can be coupled on a distal end to a lamp socket assembly 420. The motor 406 can be controlled to actuate the axle assembly 408 to deploy the second cord 422 to lower the lamp socket.

As the lamp socket moves away from the base 402, the hinge plate is no longer held against the base 402 by the cord 422. Accordingly, the hinge plate 404 is free to fall away from the base 402. As the hinge plate 404 falls away from the base 402, the first cord 414 pulls the second fairlead 418 toward the first fairlead 416. The cord 414 can be fixed to the base, or can be fixed at its proximal end to a rotating member such as a pulley. In examples in which a pulley is used, a separate motor can be used, or the same motor 406 that is used to deploy or retract the second cord 422 can be used. In instances in which the same motor 406 is used, the rate at which the second fairlead 418 is pulled toward the first fairlead 416 can be tuned, such as by being increased or decreased, through gearing on the axle assembly 408.

The motor can be controlled by a motor controller 426. Power of the lamps socket and/or the motor controller 426 can be provided via a transformer or rectifier 428, although embodiments in which no transformer is used are possible, such as in examples in which power usable by the lamp socket and the motor is available to the system 400.

Figure 4B:
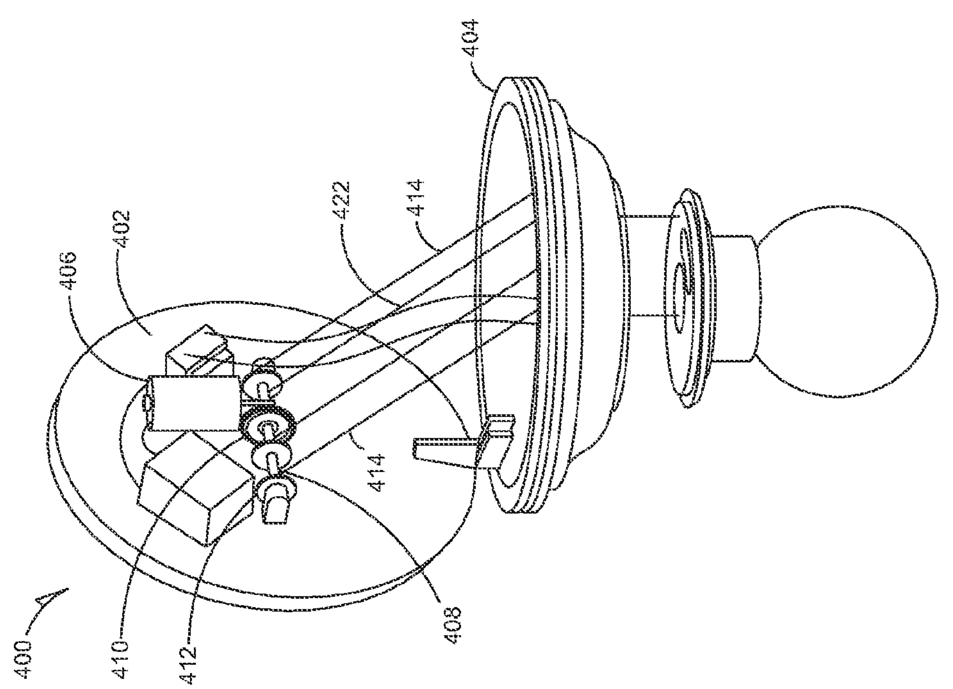
FIG. 4B is a diagram showing the system of FIG. 4A mounted vertically.
Figure 4A:
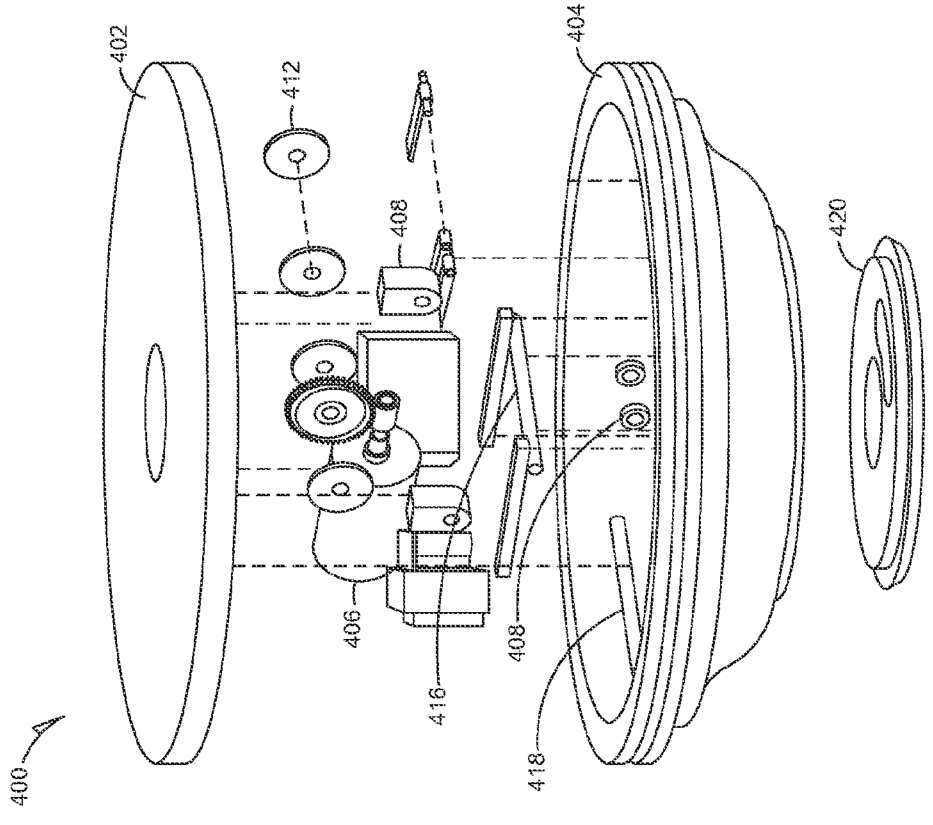
FIG. 4A is an exploded view of a lamp socket deployment system, according to an example.
Figure 4C:
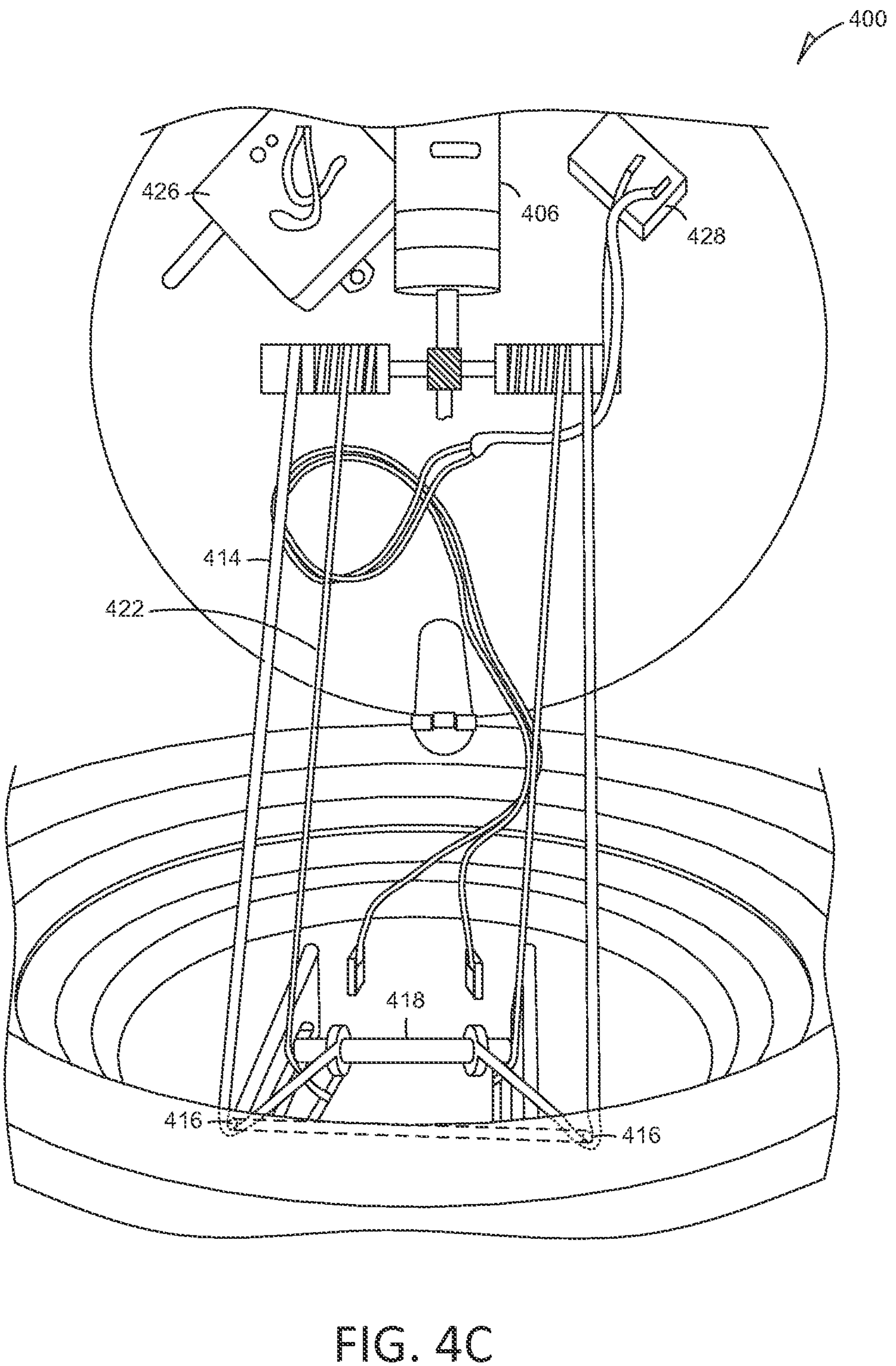
FIG. 4C is a close-up of the interior of the system of FIG. 4A.
Figure 4D:
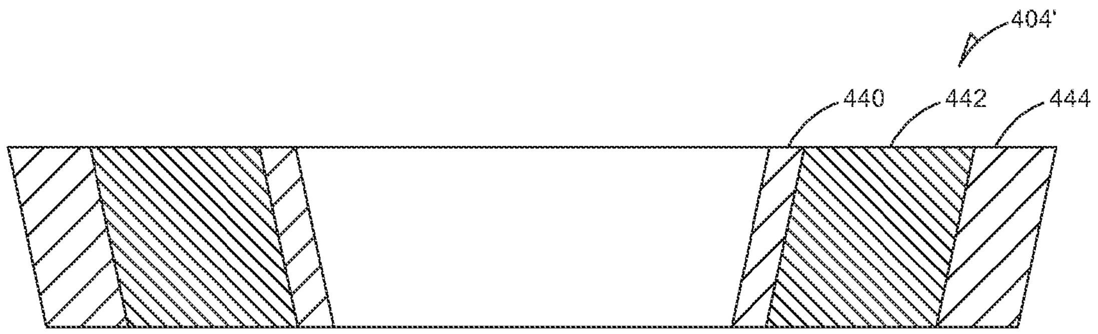
FIG. 4D is a cross-section of a fixture, according to an example.

FIG. 4D shows a cross-section of an optional set of trim rings or bezels that can be used together or separately to provide, for example, a hinge plate 404'. The hinge plate 404' can be adjusted to a number of sizes, such as diameter, by adding or removing bezel portions, including, but not limited to, portion 440, 442 and 444. Although three bezel portions are added, the present disclosure is not limited to that number, as other numbers are possible.

The hinge plate 404' illustrated can be configured to be one of three diameters. For example, and inner, smaller bezel 440 can be used to cover some openings. Large openings can be covered by a middle sized bezel 442. Still larger openings can be covered by the outer bezel 444. The bezels are nestable to one another, in some examples. In some examples they are fastened together, such as with pressure sensitive adhesive or another adhesive. In some examples they are snap-fit to one another. Examples can optionally include a configuration in which the first bezel defines a ring shape. Examples can optionally include a configuration in which the first bezel defines a square shape.

Figure 5:
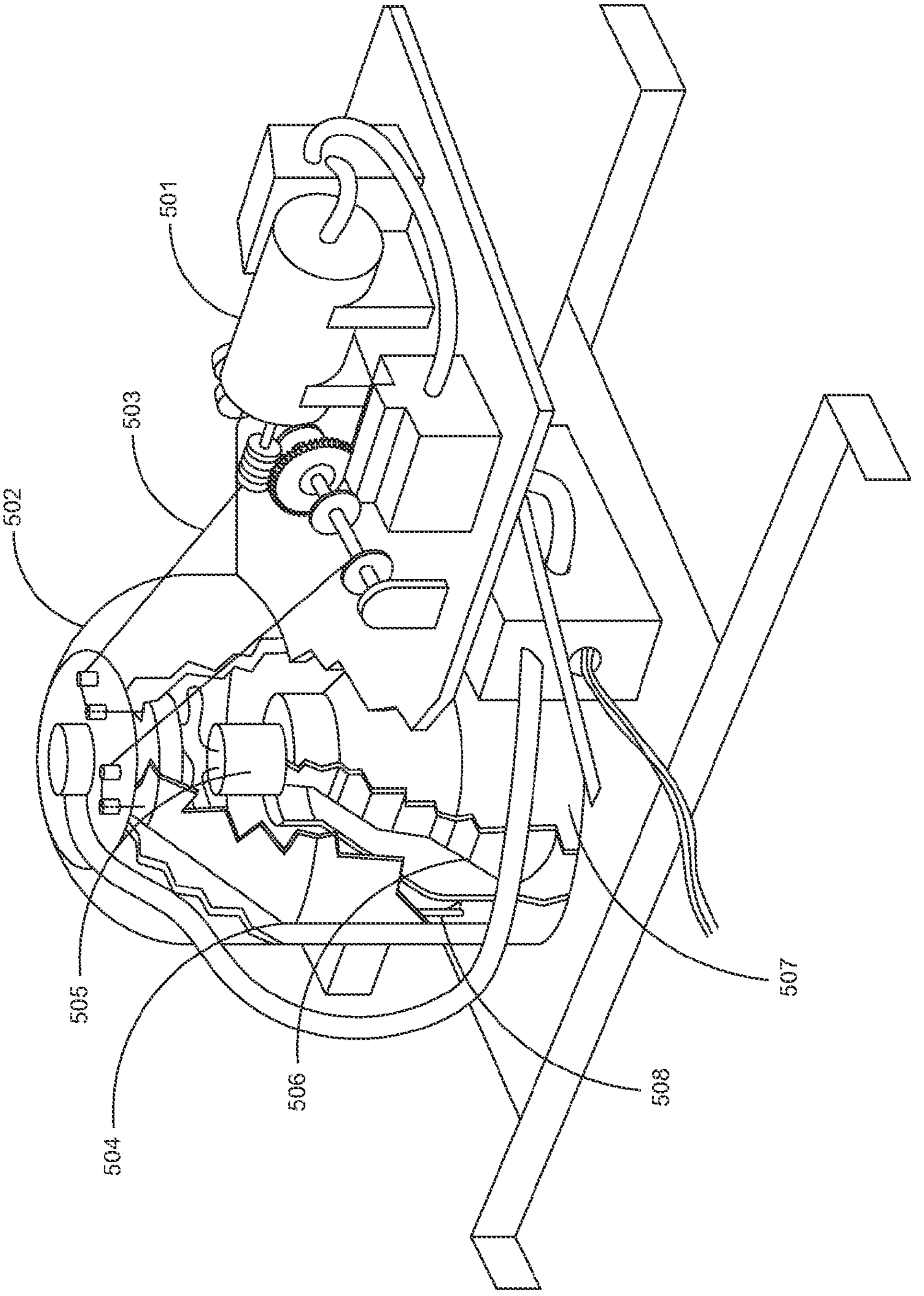
FIG. 5 is a perspective view of a recessed lamp socket deployment system, according to an example.
Figure 6A:
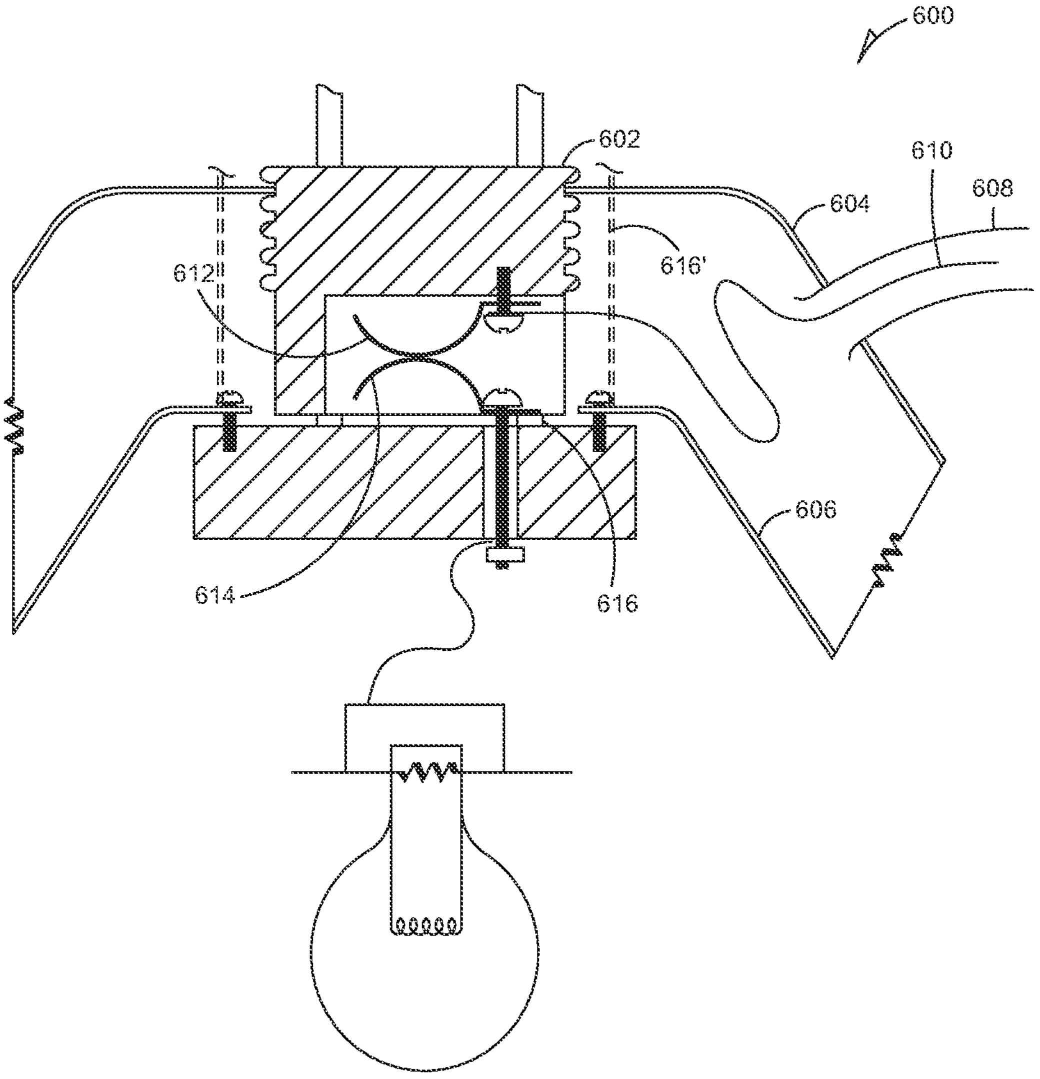
FIG. 6A is a cross-sectional view of a recessed lamp socket deployment system, according to an example.
Figure 6B:
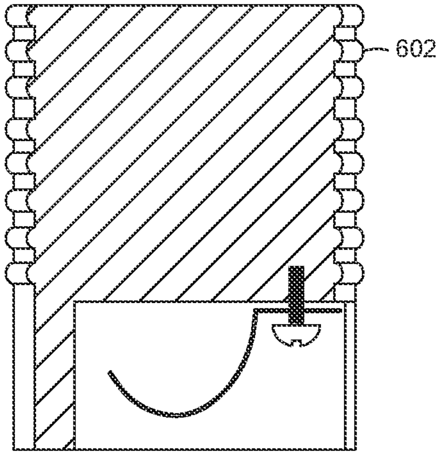
FIG. 6B is a cross-sectional view of a rotably adjustable contact for insertion into a base, according to an example.
Figure 6C:
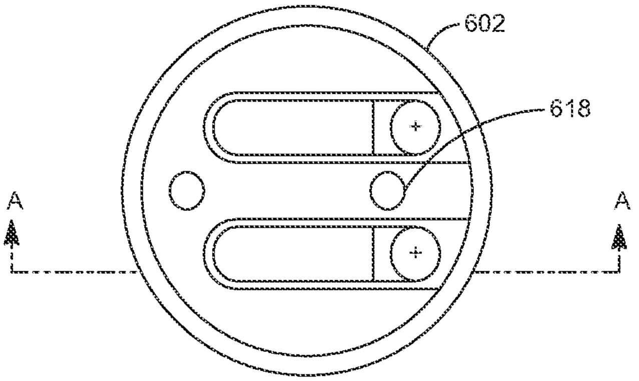
FIG. 6C is a bottom view of FIG. 6B.
Figure 6D:
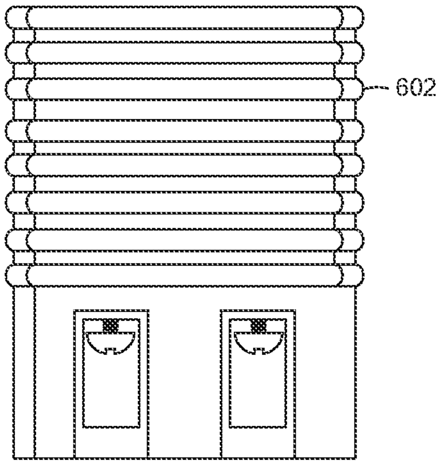
FIG. 6D is a right side view of FIG. 6B.

FIG. 5 is a perspective view of a recessed lamp socket deployment system, according to an example. The system is sized to fit in an existing opening for a recessed lamp. A motor 501 can be configured to deploy and retract a cord 503 to lower a trim sleeve 504 in which a lamp socket 505 is attached to a trim piece 507. The lamp socket 505 can house a bulb 506, such as a flood lamp. A fastener 508 such as a clip can maintain location of the socket 505 with respect to the trim sleeve 504, such as clipping to the trim piece 507.

Alternatively, the base 502 can be configured to lower a bulb 506. A trim sleeve 504 can house the bulb 506 and can be adjustable to mate to the base while remaining flush with a horizontal structure in which the system is mounted.

The system provides the benefit of allowing a user to lower a bulb for service even when that bulb is mounted in a recessed installation. The illustrated configuration can be used in a horizontally mounted or sloped configuration.

FIGS. 6A-D show views of a recessed lamp socket deployment system, according to an example. These can be used with the system of FIG. 5. The top contact 602 can be screwed into and out of the base 604 to provide for vertical adjustment, which can allow a builder to install the base deeper or shallower into an opening while still allowing for a trim sleeve 606 to both contact the top contact 602 and mate flush to a horizontal surface in which the system 600 is mounted.

A conduit 608 can mate to the base to provide a path for wiring 610 to power portions of the assembly. The cord 616 used for lowering the trim sleeve 606 can extend through openings in the top contact 618.

Optionally, a cord 616' can be used. The cord 616' can pass only through the base 604 and couple to the trim sleeve 606. Spring-loaded contacting springs 612 and 614 can be used to provide for reliable connections that can be repeatedly made and broken.

Accordingly, the system 600 provides structure and method to enable installers to adapt a recessed lighting system to a plurality of openings, even when that system is able to lower a trim sleeve for remote service. Owners of the installed system can enjoy easily replacing lamps without the aid of a ladder or other assistance to access lights that are normally above reach.

Examples and Notes

Example 1 can include a lamp system couplable to a vertical structure and a horizontal structure. The example can optionally include a base including a first electrical contact couplable to a power source. The example can optionally include a motor coupled to the base, the motor couplable to the power source. The example can optionally include a cord coupled to the motor, with the motor configured to extend and retract the cord with respect to the base. The example can optionally include a lamp socket coupled to the cord, the lamp socket including a second electrical contact mateable to the first electrical contact to electrically couple the lamp socket to the power source. The example can optionally include a configuration in which the base is hingedly couplable to a hinged member, with a proximal portion of the hinged member to be hinged to an edge portion of the base in a vertical-mount configuration, with the cord extending over a fairlead on a distal portion of the hinged member with the hinged member configured to rotate the distal portion away from the vertical structure to deploy the lamp socket away from the vertical structure.

Example 2 can include any of the previous examples and can optionally include a configuration in which the hinged member is removable in a ceiling mount configuration.

Example 3 can include any of the previous examples and can optionally include a fastener to couple the hinged member to the base to restriction rotation of the hinged member with respect to the base.

Example 4 can include any of the previous examples and can optionally include a configuration in which the fastener is located distally on the hinged member away from a hinge located at the proximal portion.

Example 5 can include any of the previous examples and can optionally include a configuration in which the motor is configured to sandwich the hinged member between the base and the lamp socket.

Example 6 can include any of the previous examples and can optionally include a control circuit to control the motor.

Example 7 can include any of the previous examples and can optionally include a configuration in which the control circuit is to receive a control signal to control the motor.

Example 8 can include any of the previous examples and can optionally include a remote to generate the control signal.

Example 9 can include any of the previous examples and can optionally include a configuration in which the remote is a wireless remote to communicate the control signal wirelessly to the control circuit.

Example 10 can include any of the previous examples and can optionally include a configuration in which the remote is a wired remote to communicate the control signal via conductor to the control circuit.

Example 11 can include any of the previous examples and can optionally include a configuration in which the remote includes a switch monitor circuit to monitor the position of a light switch coupled between the power source and the lamp socket, the switch monitor circuit to generate the control signal in association with at least one of the position of the light switch and the number of times the light switch has been switched over a time period.

Example 12 can include any of the previous examples and can optionally include a configuration in which the base includes a recess to receive the lamp socket with the lamp socket disposed within the recess.

Example 13 can include any of the previous examples and can optionally include a configuration in which the base is comprised of an outer portion mateable to a structure and an inner portion adjustably coupled to the outer portion adjustable away from and toward the outer portion.

Example 14 can include any of the previous examples and can optionally include a configuration in which the inner portion defines the recess.

In Example 15, a system can include any of the previous examples and can optionally include a base including a first electrical contact couplable to an electrical power source. The example can optionally include a motor coupled to the base, the motor couplable to the power source. The example can optionally include a cord coupled to the motor, with the motor configured to extend and retract the cord with respect to the base. The example can optionally include a lamp socket coupled to the cord, the lamp socket including a second electrical contact mateable to the first electrical contact to electrically couple the lamp socket to the power source. The example can optionally include a hinged member hingedly coupled to the base. The example can optionally include a horizontal mount mode the base is locked to the hinged member to resist movement about the hinge. The example can optionally include a configuration in which in a vertical mount mode a proximal portion of the hinged member is hingedly movable with respect to the base, with the cord extending through a channel located on a distal portion of the hinged member to deploy the lamp socket away from the vertical structure when the cord is extended.

Example 16 can include any of the previous examples and can optionally include a fixture mateable to the base, the fixture including trim to cover a gap between the base and a structure, the vertical fixture including a decorative exterior.

Example 17 can include any of the previous examples and can optionally include a configuration in which the trim comprises a first bezel defining a first bezel exterior, and a second bezel defining a second bezel interior shaped to conform to the first bezel exterior.

Example 18 can include any of the previous examples and can optionally include a configuration in which the first bezel defines a ring shape.

Example 19 can include any of the previous examples and can optionally include a configuration in which the first bezel defines a square shape.

Example 20 can include any of the previous examples and can optionally include a configuration in which the lamp socket includes a lens, the lens mateable to the trim to define a seam between the lens and the trim.

Example 21 can include any of the previous examples and can optionally include a configuration in which only the seam between the lens and the trim and a second seam between the trim and a structure are visible from an exterior of the system.

Example 22 can include any of the previous examples and can optionally include selecting whether to lock a hinged member of a lamp socket deployment system in a horizontal mode or a vertical mount mode. The example can optionally include if in the horizontal mode, mounting the base to a horizontal structure and deploying the lamp socket away from the horizontal structure by actuating an electric motor to extend a cord coupled to the lamp socket to lower the lamp socket away from the horizontal structure. In the example, if in a vertical mount mode, mounting the base to a vertical structure with the hinged member unlocked and deploying the lamp socket away from the vertical structure by rotating the hinged member away from the vertical structure.

Example 23 can include any of the previous examples and can optionally include deploying the lamp socket away from the vertical structure includes moving the fairlead along the hinged member away from a hinge of the hinged member.

Example 24 can include any of the previous examples and can optionally include selecting the horizontal mode includes locking the hinged member to the base.

Example 25 can include any of the previous examples and can optionally include selecting the horizontal mode includes decoupling the hinged member from the base.

Example 26 can include any of the previous examples and can optionally include selecting the horizontal mode includes assembling the system without the hinged member.

Each of these non-limiting examples can stand on its own, or can be combined in various permutations or combinations with one or more of the other examples.

The above detailed description includes references to the accompanying drawings, which form apart of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms “a” or “an” are used, as is common in patent documents, to include one or more than one, independent of any other instances or usages of “at least one” or “one or more.” In this document, the term “or” is used to refer to a nonexclusive or, such that “A or B” includes “A but not B,” “B but not A,” and “A and B,” unless otherwise indicated. In this document, the terms “including” and “in which” are used as the plain-English equivalents of the respective terms “comprising” and “wherein.” Also, in the following claims, the terms “including” and “comprising” are open-ended, that is, a system, device, article, composition, formulation, or process that includes elements in addition to those listed after such a term in a claim are still deemed to fall within the scope of that claim. Moreover, in the following claims, the terms “first,” “second,” and “third,” etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A lamp system couplable to a vertical structure and a horizontal structure, the system comprising:
- a base including a first electrical contact couplable to a power source;
- a motor coupled to the base, the motor couplable to the power source;
- a cord coupled to the motor, with the motor configured to extend and retract the cord with respect to the base; and
- a lamp socket assembly coupled to the cord, the lamp socket assembly including a second electrical contact mateable to the first electrical contact to electrically couple the lamp socket assembly to the power source,
- wherein the base is hingedly couplable to a hinged member, with a proximal portion of the hinged member to be hinged to an edge portion of the base in a vertical-mount configuration, with the cord extending over a fairlead on a distal portion of the hinged member with the hinged member configured to rotate the distal portion away from the vertical structure to deploy the lamp socket assembly away from the vertical structure.

2. The system of claim 1, wherein the hinged member is removable in a ceiling mount configuration.

3. The system of claim 1, including a fastener to couple the hinged member to the base to restriction rotation of the hinged member with respect to the base.

4. The system of claim 3, wherein the fastener is located distally on the hinged member away from a hinge located at the proximal portion.

5. The system of claim 3, wherein the motor is configured to sandwich the hinged member between the base and the lamp socket assembly.

6. The system of claim 1, comprising a control circuit to control the motor, wherein the control circuit is to receive a control signal to control the motor, and comprising a remote input to generate the control signal.

7. The system of claim 6, wherein the remote input is a wireless remote input to communicate the control signal wirelessly to the control circuit.

8. The system of claim 6, wherein the remote input is a wired remote input to communicate the control signal via conductor to the control circuit.

9. The system of claim 1, wherein the base includes a recess to receive the lamp socket assembly with the lamp socket assembly disposed within the recess.

10. The system of claim 9, wherein the base is comprised of an outer portion mateable to a structure and an top contact adjustably coupled to the outer portion adjustable away from and toward the outer portion.

11. A system, comprising:
- a base;
- a motor coupled to the base, the motor couplable to the power source;
- a cord coupled to the motor, with the motor configured to extend and retract the cord with respect to the base;
- a deployable load assembly coupled to the cord; and
- a hinged member hingedly coupled to the base,
- wherein in a horizontal mount mode the base is locked to the hinged member to resist movement about the hinge, and
- wherein in a vertical mount mode a proximal portion of the hinged member is hingedly movable with respect to the base, with the cord extending through a channel located on a distal portion of the hinged member to deploy the deployable load assembly away from the vertical structure when the cord is extended.

12. The system of claim 11, wherein the deployable load is a lamp socket, the base includes a first electrical contact couplable to an electrical power source, the deployable load assembly including a second electrical contact mateable to the first electrical contact to electrically couple the deployable load assembly to the power source.

13. The system of claim 11, comprising a fixture mateable to the base, the fixture including trim to cover a gap between the base and a structure, the fixture including a decorative exterior.

14. The system of claim 13, wherein the trim comprises a first bezel defining a first bezel exterior, and a second bezel defining a second bezel interior shaped to conform to the first bezel exterior.

15. The system of claim 13, wherein the deployable load assembly includes a lens, the lens mateable to the trim to define a seam between the lens and the trim, wherein only the seam between the lens and the trim and a second seam between the trim and a structure are visible from an exterior of the system.

16. A method, comprising:

selecting whether to lock a hinged member of a lamp socket assembly deployment system in a horizontal mode or a vertical mount mode;

if in the horizontal mode, mounting abuse to a horizontal structure and deploying the lamp socket assembly away from the horizontal structure by actuating an electric motor to extend a cord coupled to the lamp socket assembly to lower the lamp socket assembly away from the horizontal structure, and if in a vertical mount triode, mounting the base to a vertical structure with the hinged member unlocked and deploying the lamp socket assembly away from the vertical structure by rotating the hinged member away from the vertical structure.

17. The method of claim 16, wherein deploying the lamp socket assembly away from the vertical structure includes moving a fairlead along the hinged member away from a hinge of the hinged member.

18. The method of claim 16, wherein selecting the horizontal mode includes locking the hinged member to the base.

19. The method of claim 16, wherein selecting the horizontal mode includes decoupling the hinged member from the base.

20. The method of claim 16, wherein selecting the horizontal mode includes assembling the system without the hinged member.

* * * * *

UNITED STATES PATENT AND TRADEMARK OFFICE

CERTIFICATE OF CORRECTION

PATENT NO. : 8,733,985 B2
APPLICATION NO. : 13/572382
DATED : May 27, 2014
INVENTOR(S) : Greg Lyle Storm It is certified that error appears in the above-identified patent and that said Letters Patent is hereby corrected as shown below:

In the Claims

Column 11, line 5, Claim 16, delete "abuse" and insert --a base--, therefor

Column 11, line 11, Claim 16, delete "triode," and insert --mode,--, therefor

Signed and Sealed this
Fourth Day of November, 2014

Michelle K. Lee

Michelle K. Lee
*Deputy Director of the United States Patent and Trademark Office*